Jan. 12, 1965  A. F. REID  3,165,384
PROCESS OF CONCENTRATION OF SOLUTES
Filed May 7, 1959  2 Sheets-Sheet 1

INVENTOR.
ALLEN F. REID
BY
ATTORNEY

INVENTOR.
ALLEN F. REID

…………………

United States Patent Office 3,165,384
Patented Jan. 12, 1965

3,165,384
PROCESS OF CONCENTRATION OF SOLUTES
Allen F. Reid, The University of Texas,
5323 Harry Hines Blvd., Dallas 35, Tex.
Filed May 7, 1959, Ser. No. 811,732
2 Claims. (Cl. 23—310)

This invention relates to the change in the relative concentration of one or more of the constituents of a liquid composition, such as a liquid solution.

The object of the invention is to provide a process subjecting the solution to a series of treatments to increase the proportionate amount of one or more constituents of a separate portion of the solution while at the same time decreasing the concentration of similar constituents in another separate portion of the solution.

Another object of the invention is to provide the transfer of a constituent of a solution from one phase to another phase by direct interface contact of the two phases.

A further object of the invention is to provide a method employing a series of operations with a recycling and a reconditioning of process materials to produce the desired products in an energy-conserving and economic manner.

A further object is the production of industrial, agricultural or household water from sea or brackish water where economy of production is intimately tied to the energy requirements.

Figure 1:
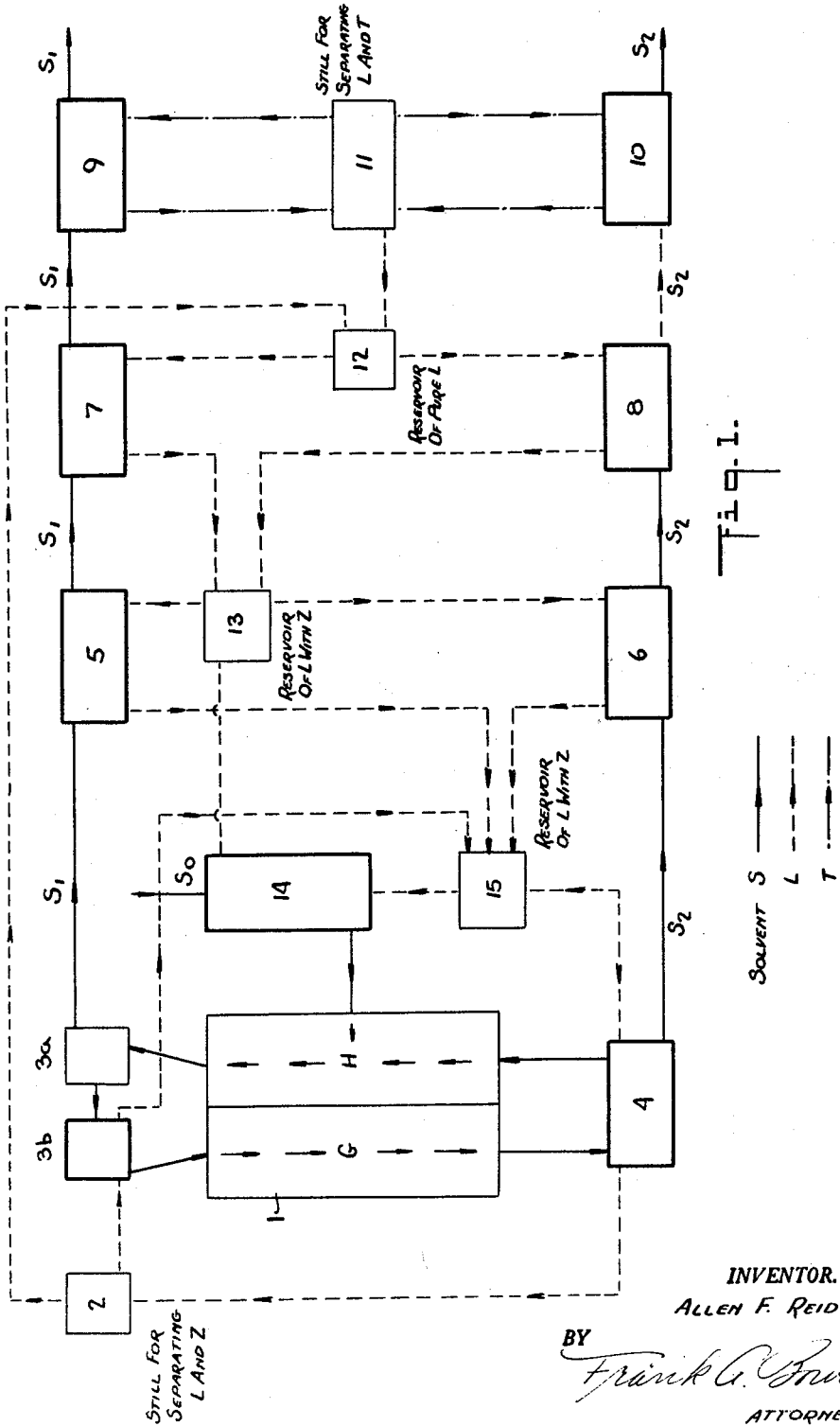
Figure 2:
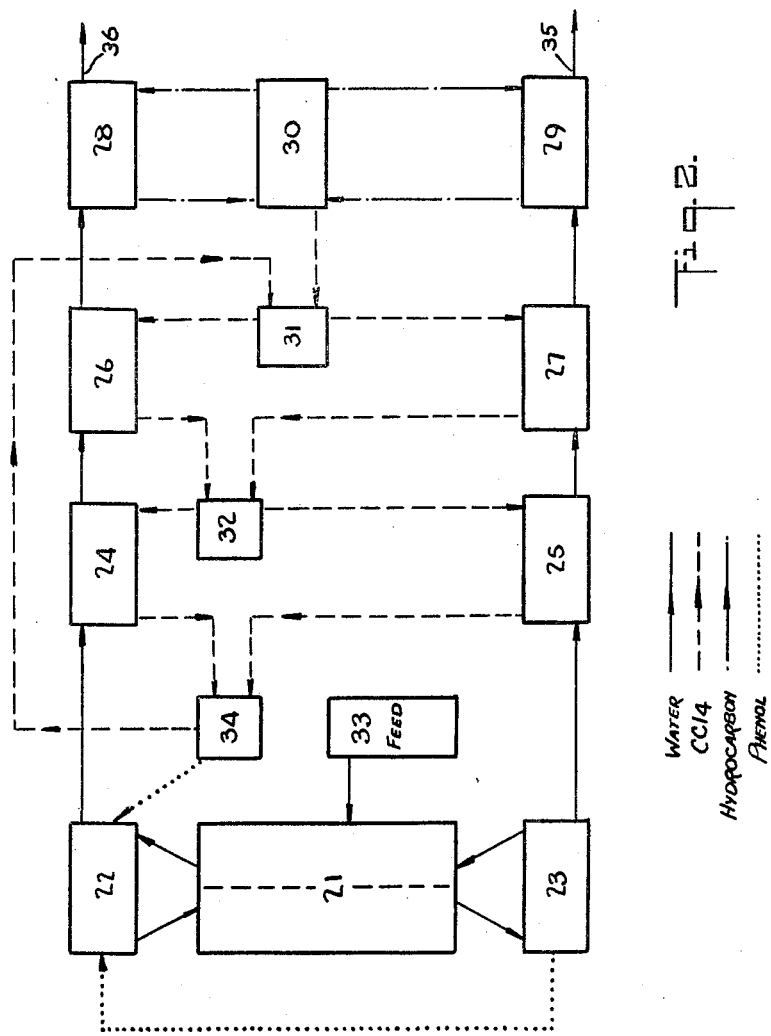

Other and further objects and advantages will become apparent from the following description taken in connection with the drawings, in which:

FIG. 1 illustrates a flow diagram of a general application of this invention; and FIG. 2 illustrates a flow diagram of a specific embodiment.

In general, the process forms the solution into two separate portions or phases and increases the original solute A in one phase and depletes the original solute A in the second phase by transferring some of the original solute between the two phases. The phases are formed by the addition of a third constituent in a concentrated form in one stage and a diluted form in the other stage. The third constituent is then removed from the separate portions or phases to form a solution depleted of the first solute A and another separate solution enriched with the first solute A.

The mechanisms of the process are the treating of the original solution with said third constituent, the introduction of the treated solution into a concentration cell in which the concentration of the original solute A is either increased or decreased in one portion of the solution followed by the removal of that changed portion of the solution from the cell and treatment of the removed portion in order to re-establish therein the original conditions for the process.

The other portion of the cell solution, in which the concentration of the solute is changed in an opposite direction to the first other portion of the solution, is also removed from the cell and treated to re-establish the original conditions for the process.

As a result of these operations a solution with an intermediate concentration of solute A has been processed to yield one portion of a more highly concentrated solution of A and another portion of a solution depleted in A. For simplicity, the terms "solute" and "solvent" are intended to include generally the constituents of a colloidal suspension as well as those of a true solution. Where further concentration or depletion is desired beyond any stage, the products of the concentration procedure described may be further treated by the same process. One of these methods effecting further relative concentration or depletion is the placing of each separation stage contiguous to the next stage with the same type of countercurrent operation used in a rectifying system. Another method is a recycling arrangement such as that described in my U.S. Patent No. 2,772,953, dated December 4, 1956.

One method for obtaining the desired change in concentration of the solute in a solution relies on the change in solubility of a solute A when another different solute is introduced into the solution. When a solute A is soluble in each of two different solvents which are in separate phases communicating with each other, the solute A will distribute itself in such a manner as to favor dissolution and relative concentration in the solvent in which it is more soluble. There are many instances in which the addition of a second solute to a solution containing A will decrease the solubility of such a solute A to an extent depending on the concentration of the second or added solute. Where upon adding this second solute to the solution, there is a division of the solution into two phases with different concentrations of the second solute, then there will be a redistribution of the original solute A such that its concentration per unit volume of the solvent will be higher in one phase than in the other. Upon separation of these phases and the subsequent removal of the second solute, one of the resulting portions of the solvent or solution will have a higher concentration of the original solute A and one will have a lower concentration of A. The following example serves to illustrate the method.

*Example I*

Phenol was added to a 0.500 molal solution of sodium chloride in water. It dissolved and the solution was allowed to come to equilibrium at 22.5° C. The solution separated into two phases, the top phase containing 5.9% phenol and the bottom phase 69.8% phenol. The phases were separated and the phenol was extracted from each phase with chloroform. The sodium chloride in the extracted top phase water was 0.586 molal; the sodium chloride in the extracted bottom phase water was 0.116 molal. The phenol and chloroform could be separated by conventional distillation methods so that both would be again available for further process operation.

An alternative method for the removal of phenol from solution was demonstrated by placing a solution identical with the top phase in contact with one-fifth its weight of finely divided activated charcoal at 25° C. for 10 minutes. At the end of that period 92.4% of the phenol was sorbed to the charcoal. Further sorption could be carried out to bring the phenol concentration in the solution to as low a value as desired. The phenol may be recovered from the sorber by conventional methods such as leaching with an appropriate solvent with subsequent distillation of the solvent. This variation of means of removal of an added solute may be used when appropriate in any method set forth in which treatment of the solution is by the addition of another solute.

Another examples serves to illustrate some differences in operation:

*Example II*

Tetronic 702, a polyoxyethylene compound of molecular weight between 2500 and 3000 made by the Wyandotte Chemicals Corporation, Wyandotte, Michigan, and herein designated as Y, was added to 0.050 molal solution of sodium chloride in water. It dissolved and the solution was allowed to come to equilibrium at 48° C. The solution had separated into two phases, the top phase containing 1% Y and the bottom contaiing 49% Y. The sodium chloride distributed itself between these two phases so that the concentration in the top phase was 1.26 times the concentration for the same amount of water in the bottom phase. The two phases were separated. The bottom phase was heated to 66° C. Most of the Y separated in a slightly hydrated condition (17% water) leaving a supernatant sodium chloride solution containing only 1% Y which was 15% less concentrated in sodium chloride than the solution in the upper phase at 48° C. A small amount of salt was still dissolved in the hydrated Y, but the Y in this form could practically be used over and over again in similar operations for the changing of sodium chloride concentration in water. When necessary, the small amount of Y left in the separated solutions described could be removed by conventional methods such as sorption or extraction. This example illustrates another variation of the means of removal of an added solute which may be used when appropriate in any method set forth in which teratment of the solution is by addition of another solute.

The operation of the invention may be illustrated by another example:

*Example III*

Twenty-eight milliliters phenylhydrazine were added to 35 milliliters 0.50 molal solution of sodium chloride in water. It dissolved and the solution was allowed to come to equilibrium at 24° C. The solution separated into two phases, the top phase containing 8.4% phenylhydrazine and the bottom phase containing 56.0% phenylhydrazine. The sodium chloride distributed itself between these two phases so that its concentration in the top phase was 1.42 times its concentration for the same amount of water in the bottom phase. The two phases were separated and were cooled to 10° C. Solid hydrated phenylhydrazine separated out from each phase leaving a supernatant sodium chloride solution in each case containing only 5.4% phenylhydrazine. The phenylhydrazine in this form could practically be used over and over again in similar operations for the changing of sodium chloride concentration in water. When necessary, the phenylhydrazine left in the separated solutions described could be removed by conventional methods such as sorption or extraction. This variation of means of removal of an added solute may be used when appropriate in any method set forth in which the treatment of the solution is by addition of another solute.

The operation of the invention in a method of continuous countercurrent operation is illustrated in the following example:

*Example IV*

A system was set up to vary the concentration of sodium chloride in water with phenol as the added solute. A glass tube 48 centimeters long and 18 millimeters in diameter was packed with 3/16" diameter pyrex helices for 40 cm. of the tube's length. A phase solution G was introduced at the top and a phase solution H was introduced at the bottom of the tube. Both solutions ran the length of the tube but in a countercurrent direction to each other, each leaving the tube at the opposite end from which it started. This system was operated for ninety minutes to develop a relatively steady state after which production samples were taken for analysis. On entering the concentration cell the solution G was 0.067 molal to sodium chloride and 72.3% phenol; and the solution H was 0.015 molal to sodium chloride and 6.1% phenol. On discharge from the concentration cell the solution G was 0.015 molal to sodium chloride and 70.7% phenol; and the solution H was 0.076 molal to sodium chloride and 6.3% phenol. The operation of this sequence of concentration and depletion may be traced by starting at the end at which the solution G is introduced and the solution H is discharged. Solution G loses some of its sodium chloride through the liquid-liquid interface and continues on its way down the tube. Solution H flows in the opposite direction where it is continuously acquiring an increased concentration of sodium chloride from the solution G, finally leaving the system with a concentration of sodium chloride higher than the original concentration of sodium chloride in the solution G. In the meantime solution G flows toward its exit becoming progressively less and less concentrated in sodium chloride until it leaves the system with a concentration of sodium chloride as low as the original concentration of sodium chloride in H.

A small amount of the depleted phase solution G may be removed and the phenol extracted from the solution to form a water product depleted of sodium chloride and phenol; and the remainder of the depleted phase solution G may be reintroduced into the system as phase solution H. As an overall consequence of this method of operation with reflux at one end the original solution is separated into two portions, one with a higher and one with a lower concentration of sodium chloride. When desired, the adaptation to a system with reflux and production at both ends can be made using standard engineering principles.

An embodiment of one of the methods performed in accordance with the invention is diagrammatically illustrated in FIG. 1. In the concentration cell 1 the two phases of the solution are in liquid to liquid interface contact for the transference of the solute from one phase to the other, using engineering practices standard to liquid-liquid extraction. The units 3b, 4, 5, 6, 7, 8, 9, 10 and 14 are liquid-liquid extractors for removing solute from the solutions. Stills 2 and 11 are provided for the recovery of solvents and reservoirs 12, 13 and 15 are provided for storing solvents. The solvent S and solute X are the primary components of the solution $S_0$ treated in the process. In the process this solution $S_0$ is divided into two separate portions, $S_1$ and $S_2$. The concentration of the solute X in the portion $S_1$ is increased and is substantially reduced in the portion $S_2$. The solute Z is added to the solvent S for forming solvent S into separate phases. Solvent L extracts the solute Z from the solution. Solvent T extracts L from the solvent S. The solute Z and the solvents L and T are used in connection with the processing of both portions $S_1$ and $S_2$ of the solution.

The process diagrammed in FIG. 1 shows the solution $S_0$, composed of the solvent S and the solute X, fed to the extractor 14. A solution of solvent L with solute Z dissolved therein is fed to the extractor 14 from the reservoir 15. The solute Z is transferred to the solution $S_0$. The solution $S_0$ comprises solvent S, solute X and solute Z is fed to an intermediate portion of the phase H of the cell 1 to mix with a solution comprising solvent S, solute X and solute Z. This mixture forms a dilute solution of Z in S. As the solution fed from extractor 4 progresses from the point of feed from the extractor 4, the concentration of the solute X increases by transference of the solute X from the phase G at the liquid-liquid interface. The transference of the solute X continues to the solution mixture as it progresses to the discharge to the unit 3a. The concentrated solution of solute X in solvent S is divided to form a portion recycled to the cell 1 and a portion $S_1$. The portion $S_1$ is comprised primarily of solvent S, solutes X and Z which are discharged from 3a. The other part is delivered to the extractor 3b where additional solute Z is added from the still 2 to produce a high concentration of the solute Z to form the phase G. The solute Z may be supplied from the still 2 as a concentrated solute in the solvent L. The stripped solvent L is then fed to the reservoir 15. Alternatively, the extractor 3b may be omitted and pure solute Z may be dissolved in the solution. The phase G is fed to the concentration cell 1 and passes down through the cell in liquid to liquid contact with the phase H. As it passes through the cell 1, the phase G becomes depleted of the solute X and is discharged into the liquid-liquid extractor 4 as a solution comprising primarily the solvent S, solute Z and a depleted solute X. The solvent L is fed from the reservoir 15 to the extractor 4. The solute Z is removed from the phase G and discharged to the still 2. The solution $S_2$ comprising primarily solvent S, solute Z and depleted solute X is discharged from extractor 4 in two directions. From the extractor 4 a portion of the solution $S_2$ is fed to the concentration cell 1. The other portion of the solution $S_2$ is then fed to the liquid-liquid extractors 6 and 8 in which the solvent L removes the last traces of the solute Z. The pure solvent L is fed from the reservoir 12 to the extractor 8 where it removes the solute Z. The solution of L and Z is then transferred to the reservoir 13 from which L is fed to extractor 6 to remove the solute Z. The solvent L becomes further concentrated with solute Z and is discharged to reservoir 15.

The solution $S_2$ is discharged from the extractor 8 and comprises primarily solvents S and L and depleted solute X. In the extractor 10 solvent T is fed to the extractor 10 and removes the solvent L from the solution $S_2$ and the combination of solvents L and T is discharged and fed to the still 11 where the solvents L and T are separated and the solvent L is discharged to the reservoir 12. The solution $S_2$ discharged from the extractor 10 comprises the solvent S with a perceptively small amount of the solute X. The solvent L containing the solute Z is fed to the still 2 where L and Z are separated or Z concentrated in L and the pure solvent L is returned to the reservoir 12 and the solute Z is delivered to the extractor 3b to dissolve in the solution to form the phase G as previously described.

The solution $S_1$, comprising primarily solvent S, concentrated solute X and solute Z, is delivered to the extractors 5 and 7 for the removal of the solute Z by solvent L. The pure solvent L is delivered to the extractor 7 from the reservoir 12. A combination of the solvent L with extracted solute Z is delivered to the reservoir 13 and in turn the solvent L with solute Z is delivered to extractor 5 for removal of solute Z and discharged to the reservoir 15. The solution $S_1$ discharged from the extractor 7 comprises primarily the solvent S, solvent L and solute X. The solvent T supplied from the still 11 removes the solvent L from the solution and the solution of solvents L and T is returned to the still 11 and separated. The pure solvent L is returned to the reservoir 12. The solution $S_1$ is discharged from the extractor 9 and comprises primarily the solvent S and a concentrated solute X. Thus, the solution $S_0$ of solvent S and solute X is divided into a solution $S_1$ having a high concentration of solute X in the solvent S and a solution $S_2$ comprising the solvent S with a small amount of solute X.

The reservoir 12 stores pure solvent L which is received from the stills 2 and 11. This pure solvent L is fed to the extractors 7 and 8. The reservoir 13 receives solvent L from the extractors 7 and 8. The solvent L contains solute Z. The reservoir 13 receives solvent L from the extractor 14. This solvent received from the extractor 14 is depleted in the solute Z. The solvent L with solute Z is supplied to the extractors 5 and 6. However, the concentration of the solute Z in the solutions $S_1$ and $S_2$ is great enough so that the solvent L removes the solute Z from the solutions $S_1$ and $S_2$. The discharge of the extractors 5 and 6 is stored in the reservoir 15 along with the discharge of the extractor 3b. The solvent L discharged by the extractor 3b contains Z. The solvent L containing solute Z of the reservoir 15 is fed to the extractor 14 to provide the solution $S_0$ with the solute Z to form the phase H for the concentration cell 1. The solvent L and the solute Z are also fed to the extractor 4. However, since the solution $S_1$ is high in Z there is a transference of the solute Z to the solvent L. The solvent L with a concentrated Z is then discharged to the still 2 where either a separately pure solvent L and solvent Z are formed, or a pure L and a solvent L highly concentrated in the solute Z.

A specific embodiment of the above process is diagrammatically illustrated in FIG. 2. In this embodiment a concentration cell 21 circulates two phases of a solution in opposite directions. A solution of sodium chloride in water is fed to an intermediate stage of the cell 21 and circulated upwardly to increase in concentration in sodium chloride. A concentrated solution is fed into the mixing and dissolving cell 22. Phenol is added to the concentrated solution from the still 34 and the precipitation cell 23. The phase of phenol and salt solution is fed to the concentration cell 21 and flows downward to discharge into the precipitation cell 23. Before the phenol is mixed with the concentrated salt solution a portion of the salt solution is separated and discharged from the dissolving and mixing cell to the extractor 24. In the cell 21 the phase with the high concentration of dissolved phenol is in liquid to liquid interface contact with the rising phase of the salt solution. The sodium chloride is transferred from the downward flowing phase to the upward flowing solution so that the downward flowing solution is depleted of sodium chloride. In the precipitation cell 23 phenol is precipitated out by cooling, leaving a salt solution depleted in sodium chloride with a low concentration of phenol. A portion of this solution is refluxed to the cell 21 to circulate up through the cell and mix with the feed of salt solution from the feed reservoir 33. As the solution moves up through the cell, it increases in concentration of sodium chloride from the downward descending phase. The other portion of the salt solution is delivered to the extractor 25. Further extraction of the phenol occurs in extractor 27 and a solution comprising the water depleted in sodium chloride and with a small amount of the carbon tetrachloride is delivered to the extractor 29 where the carbon tetrachloride is removed by a solvent fed from the still 30. The solvent and the carbon tetrachloride are separated and the carbon tetrachloride is fed to the reservoir 31. The water is then discharged at 35 depleted in sodium chloride. The concentrated solution is treated in the extractors 24 and 26 to remove the phenol by carbon tetrachloride and the final traces of carbon terachloride are removed by the solvent from the still 30 to discharge a solution of concentrated sodium chloride in water at 36.

The carbon tetrachloride is delivered to the extractors 26 and 27 from the reservoir 31 and a discharge from the extractors 26 and 27 of phenol in carbon tetrachloride is delivered to the reservoir 32 which in turn delivers the carbon tetrachloride to the extractor 24. The combination of the carbon tetrachloride and phenol is delivered to the still 34 where the carbon tetrachloride is separated from the phenol and returned to the reservoir 31 and the phenol is delivered to the cell 22 as previously described.

For every five pounds of purified water processed about one pound of carbon tetrachloride must be distilled and about forty pounds of phenol must be precipitated by cooling and redissolved with added heat. The energy expenditure required for this is approximately twenty percent of that required for conventional distillation in the production of the same amount of relatively salt-free water. With standard engineering practice much of this energy used in conventional distillation may be recovered, but with available techniques it is to be expected that a large fraction of the energy used in the process of this invention may be recovered or reutilized.

A wide range of substances may be separated, or may be concentrated or depleted in solution by the above process. While specific examples have been illustrated, there are other systems for obtaining concentration changes for a collection of other solutes, solvents, temperatures, separators, or other methods of recycling. A range in the degree of concentration is also possible by changes in these variables when more than one solute is present in the same solution.

Principles of separation may be extended to each solute individually. It is thereby evident that changes in concentration of the individual solutes may be at different rates so that the ratios of concentration of these solutes may be changed in the operation. This is tantamount to relative separation of multiple constituents of a solution.

Several methods of the process may be combined in obvious ways or the methods may be combined with methods of other processes, all in conformance with the steps as explained above, and it will be understood that various modifications can be made without departing from the principles of the invention as set forth in the appended claims.

I claim:

1. A process for increasing the concentration of a solute content in one portion of a solution while decreasing the concentration in another portion of the solution comprising circulating different phases of a solution of a salt in opposite directions in liquid interface contact, one phase moving in one direction being supplied from a salt solution feed reservoir and the other second phase being supplied from an intermediate mixing and dissolving cell forming an organic and salt solution from addition of an organic compound to salt solution discharge from said first phase, said organic and salt solution passing as said opposite flow in liquid interface contact with the first phase of the salt solution so that salt solute is transferred to the first phase from said opposite flow and there is a supply of relatively concentrated salt solution to said mixing and dissolving cell and a relatively depleted salt solution is maintained in an outflow from said second phase.

2. A process for increasing the concentration of a sodium chloride content in one portion of a solution while decreasing the concentration in another portion of the solution comprising circulating different phases of a solution of a sodium chloride in opposite directions in liquid interface contact, one phase moving in one direction being supplied from a sodium chloride solution feed reservoir and the other second phase being supplied from an intermediate mixing and dissolving cell forming an organic and sodium chloride solution from addition of an organic compound to sodium chloride solution discharge from said first phase, said organic and sodium chloride solution passing as said opposite flow in liquid interface contact with the first phase of the sodium chloride solution so that sodium chloride solute is transferred to the first phase from said opposite flow and there is a supply of relatively concentrated sodium chloride solution to said mixing and dissolving cell and a relatively depleted sodium chloride solution is maintained in an outflow from said second phase.

References Cited in the file of this patent

UNITED STATES PATENTS 2,900,223 Cunningham _____ Aug. 18, 1959

OTHER REFERENCES

Osterhaut et al.: "Science," volume 87, 1938, page 430.
Perry: "Chemical Engineers Handbook," McGraw-Hill Publ. Co., 3rd edition, pages 714–752.